(12) United States Patent
Budge et al.

(10) Patent No.: US 7,841,479 B2
(45) Date of Patent: Nov. 30, 2010

(54) APPARATUS SYSTEM AND METHOD FOR STORING CYLINDRICAL CONTAINERS

(75) Inventors: Jason Budge, Pleasant Grove, UT (US); Steven Palmer, Pleasant Grove, UT (US)

(73) Assignee: Cache Futures Inc., Lindon, UT (US)

( * ) Notice: Subject to any disclaimer, the term of this patent is extended or adjusted under 35 U.S.C. 154(b) by 219 days.

(21) Appl. No.: 11/843,017

(22) Filed: Aug. 22, 2007

(65) Prior Publication Data

US 2007/0295680 A1 Dec. 27, 2007

Related U.S. Application Data

(63) Continuation-in-part of application No. 11/265,830, filed on Nov. 2, 2005, now abandoned.

(60) Provisional application No. 60/648,739, filed on Feb. 2, 2005.

(51) Int. Cl.
*A47F 1/04* (2006.01)
(52) U.S. Cl. .................................................. 211/59.2
(58) Field of Classification Search ................ 211/59.2, 211/194, 188, 208, 175, 184, 43; 312/35; 248/222.11, 225.21
See application file for complete search history.

(56) References Cited

U.S. PATENT DOCUMENTS

| | | | | | |
|---|---|---|---|---|---|
| 2,888,145 | A | * | 5/1959 | Knott et al. | 211/59.2 |
| 3,055,293 | A | * | 9/1962 | Lariccia | 101/44 |
| 3,255,487 | A | * | 6/1966 | Nieuwenhuysen | 425/467 |
| 3,286,846 | A | * | 11/1966 | Brandes | 211/59.2 |
| 3,298,763 | A | * | 1/1967 | Di Domenico | 312/45 |
| 3,318,455 | A | * | 5/1967 | Takahashi | 211/59.2 |
| 3,669,278 | A | * | 6/1972 | Heroy | 211/184 |
| 3,784,022 | A | * | 1/1974 | Beesley, Jr. | 211/59.2 |
| 3,805,964 | A | * | 4/1974 | Titus, Jr. | 211/59.2 |
| 4,270,661 | A | * | 6/1981 | Rosenband | 211/59.2 |
| 4,287,992 | A | * | 9/1981 | Takemori | 211/59.2 |
| 4,356,923 | A | * | 11/1982 | Young et al. | 211/59.2 |
| 4,435,026 | A | * | 3/1984 | Johnson | 312/45 |
| 4,474,297 | A | * | 10/1984 | Zucker | 211/59.2 |
| 4,538,737 | A | * | 9/1985 | Delaney | 211/71.01 |
| 4,744,489 | A | * | 5/1988 | Binder et al. | 221/6 |
| 4,792,051 | A | * | 12/1988 | Miller | 211/184 |
| 4,911,309 | A | * | 3/1990 | Stefan | 211/59.2 |
| 4,997,106 | A | * | 3/1991 | Rockola | 221/95 |
| 4,998,628 | A | * | 3/1991 | Ross | 211/59.2 |
| 5,314,078 | A | * | 5/1994 | Morikiyo et al. | 211/59.2 |

(Continued)

*Primary Examiner*—Jennifer E. Novosad
(74) *Attorney, Agent, or Firm*—Steve McDaniel; Utah Valley Patent (57) ABSTRACT

A system for storing cylindrical containers includes multiple container guides positioned parallel to each other. In one embodiment, each container guide includes upper and lower track rails including left and right bearing surfaces and a track separator. The track rails guide containers placed on either side of the rails from a receiving area on the upper track to a dispensing area on the lower track. The lower track may include a concave depression proximate to the dispensing area that retains a first container at a lower relative position, thus enabling the first container to act as a stopping mechanism to subsequent containers placed in the system. The system may also include a frame that receives and supports the container guides and thereby provides one or more storage shelves capable of storing containers such as cans on a first-in first-out basis in a compact manner.

19 Claims, 5 Drawing Sheets

U.S. PATENT DOCUMENTS

| | | | |
|---|---|---|---|
| 5,392,953 A * | 2/1995 | Maldanis et al. | 221/97 |
| 5,396,997 A * | 3/1995 | Johnson | 211/59.2 |
| 5,755,338 A * | 5/1998 | vom Braucke et al. | 211/13.1 |
| 5,806,712 A * | 9/1998 | Siemsen et al. | 221/67 |
| 5,865,324 A * | 2/1999 | Jay et al. | 211/59.2 |
| 6,006,678 A * | 12/1999 | Merit et al. | 108/60 |
| 6,019,234 A * | 2/2000 | Chang | 211/184 |
| 6,244,447 B1 * | 6/2001 | Frieze et al. | 211/85.13 |
| 6,253,930 B1 * | 7/2001 | Freidus et al. | 211/59.2 |
| 6,357,606 B1 * | 3/2002 | Henry | 211/59.3 |
| 6,502,408 B1 * | 1/2003 | Corcoran | 62/63 |
| 6,786,341 B2 * | 9/2004 | Stinnett et al. | 211/59.2 |
| 6,805,250 B2 * | 10/2004 | Ondrasik | 211/184 |
| 6,968,975 B2 * | 11/2005 | Christensen | 221/298 |
| 6,991,116 B2 * | 1/2006 | Johnson et al. | 211/59.2 |
| 7,207,447 B2 * | 4/2007 | Medcalf et al. | 211/59.2 |
| 2002/0043509 A1 * | 4/2002 | Lajeunesse et al. | 211/59.2 |
| 2002/0063101 A1 * | 5/2002 | Thomas | 211/85.18 |
| 2006/0278591 A1 * | 12/2006 | Tippets et al. | 211/59.2 |
| 2007/0007221 A1 * | 1/2007 | Mann | 211/59.3 |

* cited by examiner

Fig. 9

APPARATUS SYSTEM AND METHOD FOR STORING CYLINDRICAL CONTAINERS

RELATED APPLICATIONS

This application is a continuation-in-part of U.S. patent application Ser. No. 11/265,830 entitled "APPARATUS SYSTEM AND METHOD FOR STORING CYLINDRICAL CONTAINERS" and filed on 2 Nov. 2005 now abandoned for Jason Randall Budge, Steven Leroy Palmer, and Kenneth D. Lewis which application claimed priority to U.S. Provisional Patent Application No. 60/648,739 entitled "Can Track" and filed on 2 Feb. 2005 for Jason Randall Budge and Steven Leroy Palmer. Each of these applications is incorporated herein by reference.

BACKGROUND OF THE INVENTION

1. Field of the Invention

This invention relates to apparatus, methods, and systems for storing containers, and more particularly relates to apparatus, methods, and systems for first-in first-out storage of cylindrical containers.

2. Description of the Related Art

Storage management of dated or perishable items such as food or chemicals is a task commonly required of individuals, stores, businesses, and other organizations. For example, private individuals or relief organizations may store a supply of dated or perishable items that address their short term needs while also providing a backup inventory sufficient to address disasters or other emergencies. Often, the space available for storing such items is limited. Furthermore, since dated or perishable items may become obsolete or spoiled, individuals, businesses, and other organizations need storage management devices and methods to efficiently rotate such inventories.

Dated or perishable items are commonly stored in cylindrical containers such as cans. Storage management systems for cylindrical containers currently include shelving systems that facilitate storing containers in a first-in, first-out order. In some first-in first-out storage systems, cylindrical containers such as cans may be placed onto an upper shelf and rolled down to a lower shelf where they are stopped at a dispensing area by a holding device. Subsequent containers inserted into the system roll down to the lower shelf until they are stopped by previous containers. Such first-in first-out storage systems provide containers in the order that they were inserted, thereby providing a continuous usable supply to the user.

One issue related to first-in first-out shelving systems is accommodating different sized containers. Typically, such shelving systems are limited to a few common container sizes. Furthermore, the shelving arrangement is typically fixed due to the loads that may be placed on the shelving system.

From the foregoing discussion, it should be apparent that a need exists for a system, apparatus, and method for storing cylindrical containers that is adjustable yet stable. Beneficially, such a system, apparatus, and method would store cylindrical containers on a first-in first-out basis and provide high capacity storage in a compact space.

SUMMARY OF THE INVENTION

The present invention has been developed in response to the present state of the art, and in particular, in response to the problems and needs in the art that have not yet been fully solved by currently available systems and methods for storing cylindrical containers. Accordingly, the present invention has been developed to provide a system, apparatus, and method for storing cylindrical containers that overcome many or all of the above-discussed shortcomings in the art.

In one aspect of the present invention, a system for storing cylindrical containers includes multiple container guides positioned substantially parallel to each other. In one embodiment one or more spacing members interlock with the container guides and maintain a selected track width between adjacent container guides. In some embodiments, each container guide includes both an upper track rail and a lower track rail that guides containers placed on either side of the rails. The upper track rail guides containers from a receiving area at the front of the storage system toward a transfer area at the rear of the storage system. In turn, the lower track rail receives containers at the transfer area and guides the containers toward a concave depression proximate to a dispensing area at the front of the storage system.

The spacing member may include a large number of interlocking positions that facilitate selecting a large variety of spacing widths between adjacent container guides. In certain embodiments, the container guides rest upon the spacing members and multiple shelves may be formed by alternately stacking container guides and spacing members.

The system may also include a frame that receives and supports the container guides and thereby provides one or more storage shelves capable of storing containers such as cans on a first-in first-out basis in a compact manner. Inclusion of a frame may increase the load bearing capacity of the storage system. In one embodiment, the frame includes front and back support members that are substantially horizontal and parallel to each other. The front and back support members may support multiple container guides and the containers stored between the container guides. Using a front and a back support member and container guides of sufficient strength to span between the front and back support members, enables the spacing width to be adjusted to match the height of the cylindrical containers stored between adjacent container guides and improves the storage density of the container storage system. The container guide may include a plurality of frame mating elements that mate the container guide to a frame and enable the container guide to bear a load. In certain embodiments, the spacing members may be integral to the frame thus reducing the number of required components.

In another aspect of the present invention, a container guide usable within the aforementioned storage system includes the upper track rail and the lower track rail with a concave depression proximate to the dispensing area. The concave depression retains a first container at a lower relative position along a lower track trajectory than a second container in order to direct a substantial portion of a collision force between the second container and the first container into the lower track rail. The container guide may also include one or more frame mating elements that mate the container guide to the frame and ensure storage stability. The frame mating elements mate the container guide to the frame and enable the container guide to bear a load.

The upper track rail and the lower track rail may include left and right bearing surfaces upon which the containers roll or rest. In one embodiment, the left and right bearing surfaces have a width of less than 0.75 inches enabling storage of containers that are less than 1.50 inches in height. The upper track rail and the lower track rail may also include a track separator that separates containers within horizontally adjacent tracks or bins. In certain embodiments, the track separator may be a ribbed track separator that increases the strength of the container guide. In some embodiments, the upper track rail may be vertically extended at the transfer area to retain containers that stack at the transfer area and prevent such containers from escaping the container guides. The lower track rail may also include a stop that prevents containers from overrunning the dispensing area.

The lower track rail may also include a concave depression proximate to the dispensing area that retains a first container at a lower relative position along a lower track trajectory than a second container in order to direct a substantial portion of a collision force between the second container and the first container into the lower track rail. This concave depression enables the first container placed in the storage system to rest at a lower position in the lower track rail and act as a stopping mechanism for the second and subsequent containers placed in the storage system, with the majority of the force (from the moving containers) directed by the first container into the track rails and concave depression.

The upper track rail, lower track rail, interlocking element(s), concave depression, and frame mating element(s) may be integrally formed into a single unit. For example, the aforementioned elements as well as other elements may be injection molded to form one or more container guides from a single mold. In certain embodiments, the container guide includes one or more pedestals or feet that enable the container guides to stand independent of a frame.

In another aspect of the present invention a method for storing cylindrical containers includes providing a plurality of container guides used to store cylindrical containers therebetween when positioned substantially parallel to each other, each container guide has an upper track rail and a lower track rail. The upper track rail guides a container placed on either side of it from a receiving area toward a transfer area, and the lower track rail guides a container placed on either side of it toward a dispensing area.

The present invention provides distinct advantages over the prior art. Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment. Furthermore, the described features, structures, or characteristics of the invention may be combined in any suitable manner in one or more embodiments.

Figure 1:
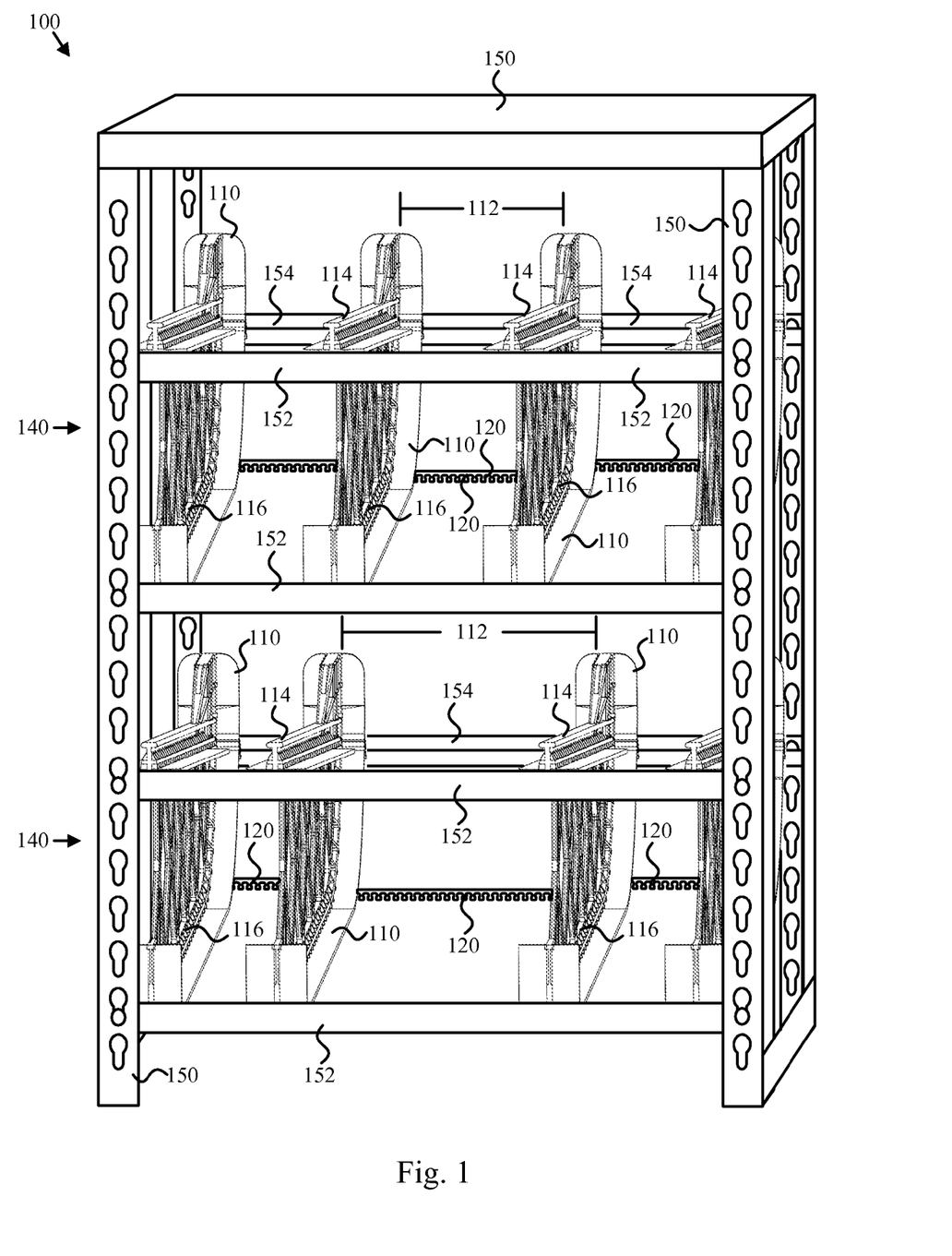
FIG. 1 is a perspective front view drawing depicting one embodiment of a container storage system of the present invention.

FIG. 1 is a perspective front view of one embodiment of a container storage system 100 of the present invention. As depicted, the container storage system 100 includes a number of container guides 110, and spacing members 120, that facilitate storing cylindrical containers 130 on one or more shelves 140 within a frame 150. The container storage system 100 facilitates compact storage of cylindrical containers such as cans on a first-in first-out basis. To show the functional elements of the storage system 100, no containers 130 are shown in FIG. 1.

Within each shelf 140, the container guides 110 are positioned substantially parallel to each other at a selected horizontal spacing 112 corresponding to the height of the cylindrical containers 130 stored between the container guides 110. In the depicted embodiment, each container guide 110 includes an upper track rail 114 and a lower track rail 116.

The frame 150 receives the container guides 110 and supports the load provided by the containers 130 resting within the container guides 110. In the depicted embodiment, each container guide 110 is supported by one or more front support members 152 that are substantially horizontal and positioned parallel to one or more back support members 154. In some embodiments, a support shelf may rest between a front support member 152 and a back support member 154 to facilitate the frame supporting the container guides 110. The container guides 110 may also be configured to rest on a support shelf (not shown).

Figure 2:
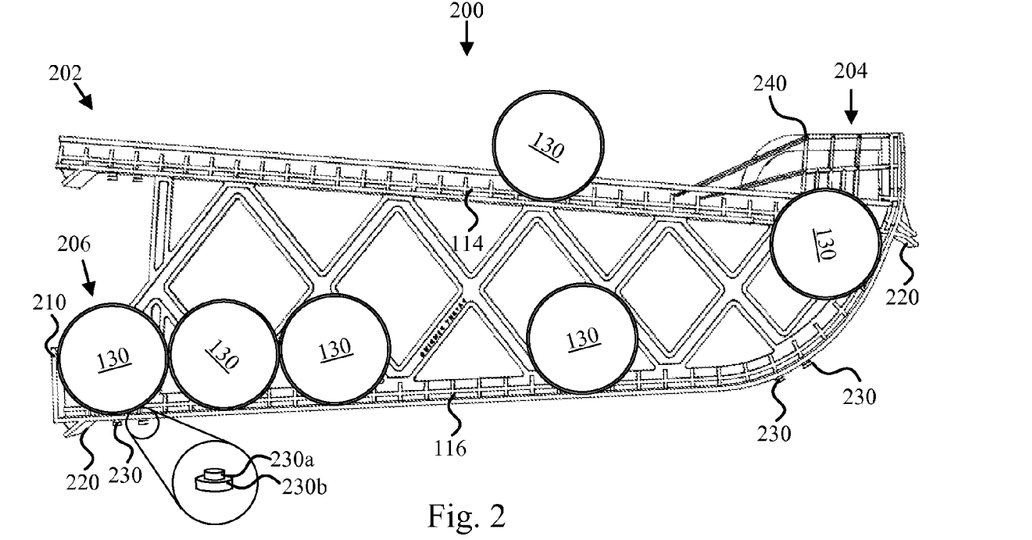
FIG. 2 is a perspective side view drawing depicting one embodiment of a container guide of the present invention.

FIG. 2 is a perspective side view drawing depicting one embodiment of the container guide 110 in greater detail namely a container guide 200. As depicted, the container guide 200 includes the upper track rail 114, the lower track rail 116, a container stop 210, two or more frame mating elements 220, one or more interlocking elements 230, and a vertically extended section 240 of the upper track rail 114. Two or more of the depicted container guides 110 may be positioned in parallel within a frame 150 to provide storage for containers of a particular height.

The upper track rails 114 of adjacent container guides 110 guide a container 130 placed therebetween from a receiving area 202 toward a transfer area 204, whereupon the containers 130 drop through the transfer area 204 and are received by the lower track rails 116. In turn, the lower track rails 116 of adjacent container guides 110 guide the containers 130 to a dispensing area 206. The container stop 210 positioned at the end of each lower track rail 116 prevents the containers 130 from overrunning the dispensing area 206.

The frame mating elements 220 mate the container guides 110 to the frame 150 (see FIG. 1) and enable the frame 150 to support the container guides 110 and bear a load applied to the container guides in a secure manner. The interlocking elements 230 interlock the container guide 110 to the spacing members 120. In the depicted embodiment, the interlocking element 230 includes a shank 230a that snaps into a selected interlocking position of the spacing member 120 (see FIG. 3) to provide the selected horizontal spacing 112, and a cap 230b that vertically restrains the spacing member and retains the spacing member 120 between the cap 230b and the lower track rail 116. In one embodiment, the spacing members 120 are integral to the frame 150. In such an embodiment, the interlocking elements 230 may also function as the frame mating elements 220. The vertically extended section 240 prevents containers that stack at the transfer area from escaping the container guides.

Figure 3:
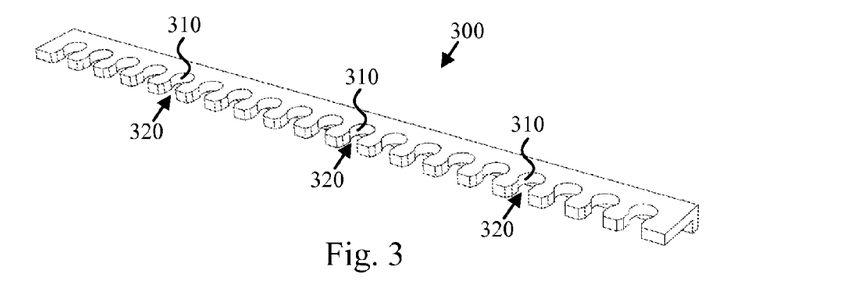
FIG. 3 is a perspective view drawing depicting one embodiment of a spacing member of the present invention.

FIG. 3 is a perspective view drawing depicting one embodiment of a spacing member 300 of the present invention. The spacing member 300 includes a variety of interlocking positions 310 that enable selection of the selected horizontal spacing 112. In the depicted embodiment, each interlocking position 310 is void 320 that is shaped to interlock with an interlocking element 230 of a container guide 110. For example, the shank 230a of the interlocking element 230 may snap into the interlocking position 310 and fit within the void 320. In one embodiment, the interlocking element 230 slips into a slot shaped interlocking position (see FIGS. 5 and 6).

Figure 4:
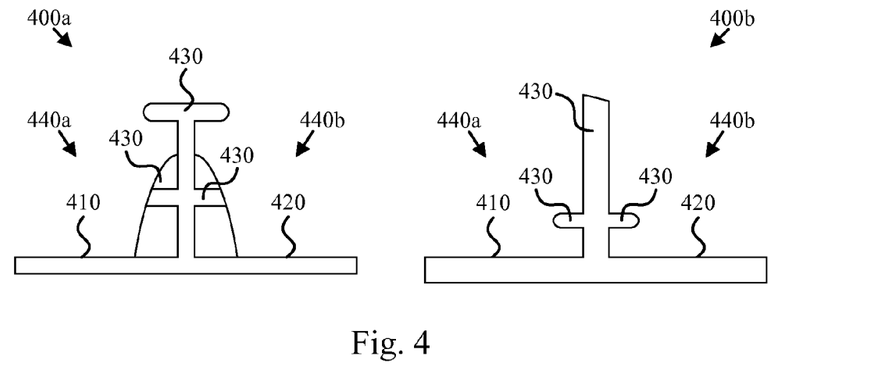
FIG. 4 is a cross-sectional view drawing depicting alternate embodiments of a track rail of the present invention.

FIG. 4 is a cross-sectional view drawing depicting alternate embodiments of a track rail 400 of the present invention. The depicted track rails 400a and 400b include a left bearing surface 410, a right bearing surface 420, and a track separator 430. The track rails 400a and 400b are two examples of the track rails 114 and 116 depicted elsewhere in the Figures. The track rails 400a and 400b enable the container guides to store containers of various heights.

The bearing surfaces 410 and 420 bear the cylindrical containers as they are guided along a left track 440a or a right track 440b. In one embodiment, the bearing surfaces 410 and 420 have a width of less than 0.75 inches. In such a configuration, the rails may be placed immediately adjacent to each other bear containers having a height that less than the total width of the left and right bearing (i.e. less than 1.5 inches). Furthermore, the rails may be separated up to the maximum horizontal distance supported by the spacing element 120 and the frame 150 (if used) and bear containers that fit within the maximum distance. Thus the track rails and container guides of the present invention may accommodate a wide range of container heights.

Furthermore, to facilitate bearing greater loads, the track separator 430 may be shaped to increase the stiffness of the rail 400 and the load bearing capacity of the bearing surfaces 410 and 420. In the depicted embodiment, the track separator 430a is both horizontally and vertically ribbed to substantially increase the bearing capacity of the track rail 400 without substantially increasing the weight of the container guides 110.

Figure 5:
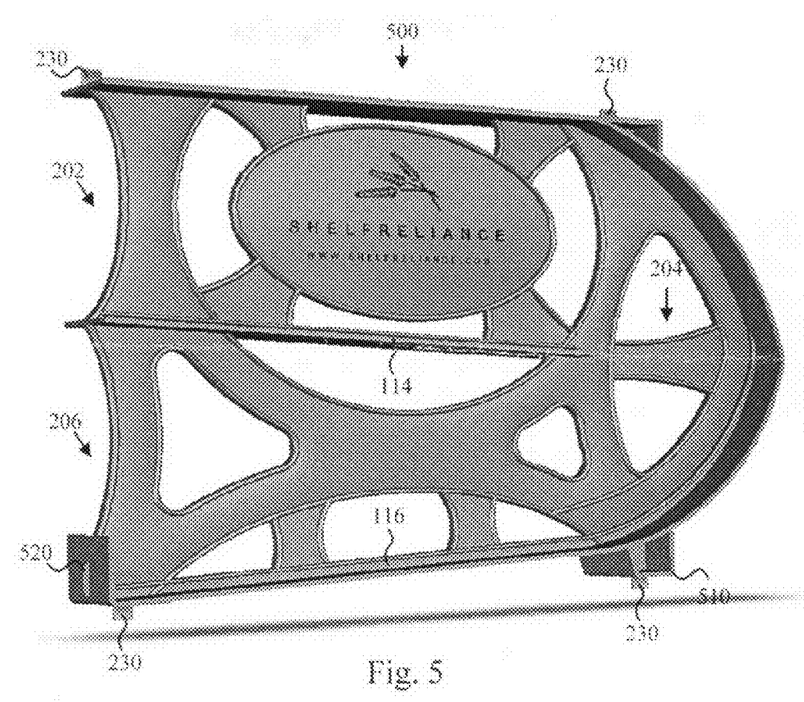
FIG. 5 is a perspective side view drawing depicting an alternate embodiment of a container guide of the present invention.

FIG. 5 is a perspective side view drawing depicting an alternate embodiment of a container guide of the present invention namely a container guide 500. The container guide 500 is an alternate example of the container guide 110 depicted elsewhere in the Figures. In addition to elements previously discussed, the container guide 500 includes a foot 510 that enables the container guide to sit on a level shelf. In certain embodiments, the container guides 500 may be stacked.

Figure 6:
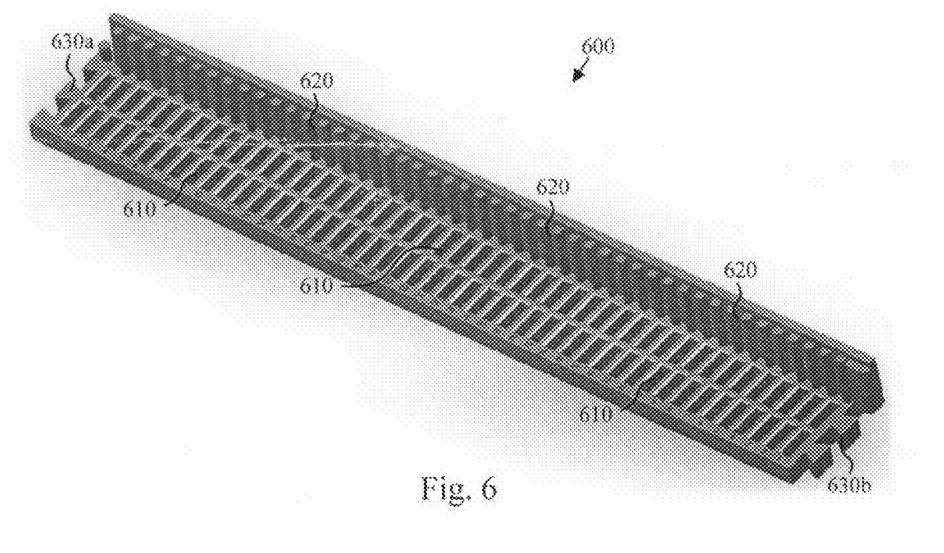
FIG. 6 is a perspective view drawing depicting an alternate embodiment of a spacing member of the present invention.

Referring now to FIG. 6 as well as FIG. 5, the depicted interlocking elements 230 are rectangular protrusions that mate with the spacing member 600 at a position selected from a large number of rectangular interlocking positions 610. In addition, the container guide 500 may include a corresponding number of stabilization elements 520 that mate with the stabilizers 620. Furthermore, the interconnectors 630 (i.e. 630a and 630b) enable the spacing member 600 to be interconnected to additional spacing members 600. Interconnecting to additional spacing members facilitates the assembly of spacing members of arbitrary length.

Figure 7:
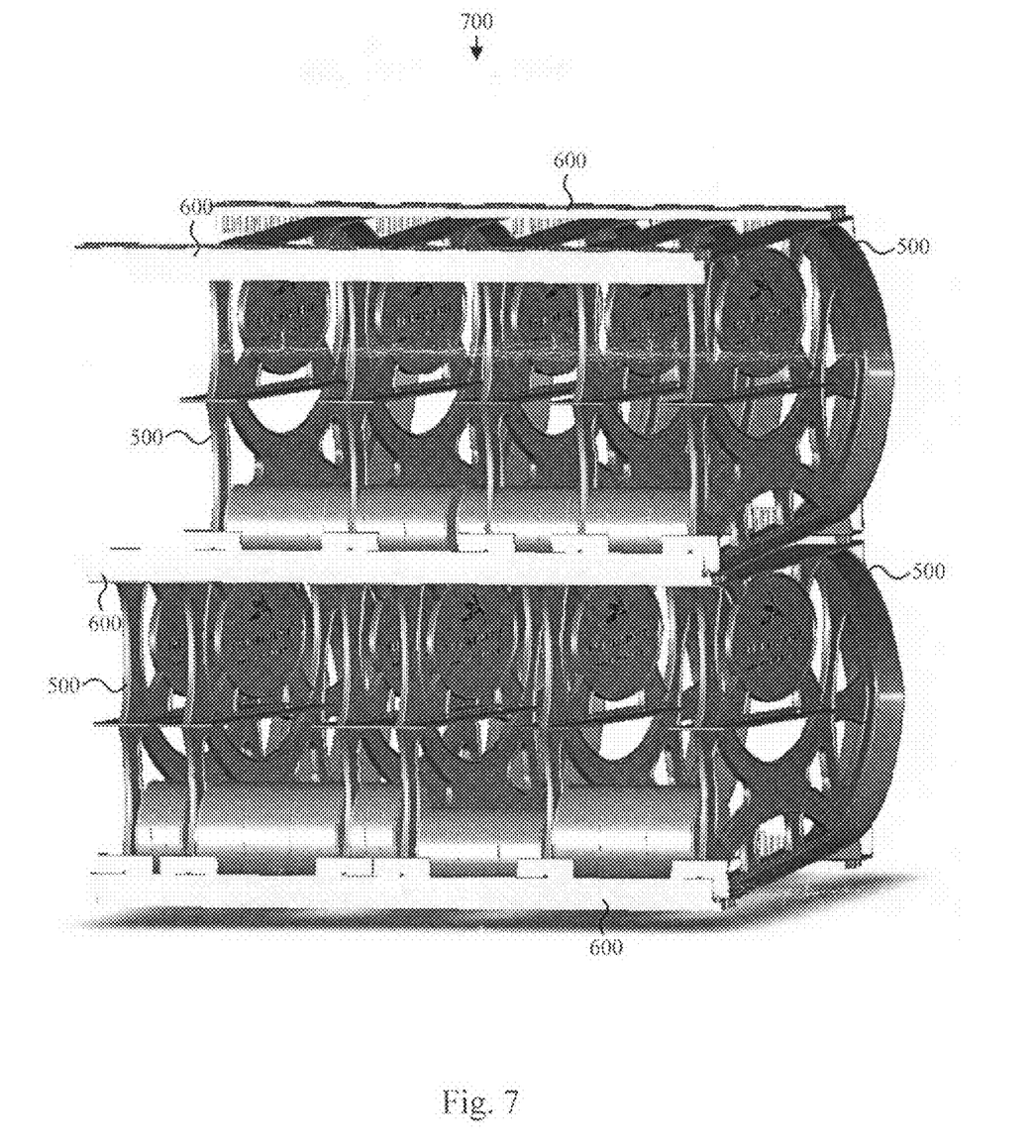
FIG. 7 is a perspective view drawing depicting an alternate embodiment of a storage system of the present invention.

Referring now to FIG. 7, the container guides 500 and spacing members 600 may be interconnected, interlocked, and stacked to provide a modular storage system 700 having a selected width and height. For example, space available within a cupboard may be filled with the modular storage system 700 to facilitate high density storage of cans of food within a residence. The stored cans may be purchased in response to promotional offers and automatically rotated by the storage system 700 to provide an ongoing supply of food sufficient to sustain the members of the residence through personal, local, and regional emergencies.

Figure 8:
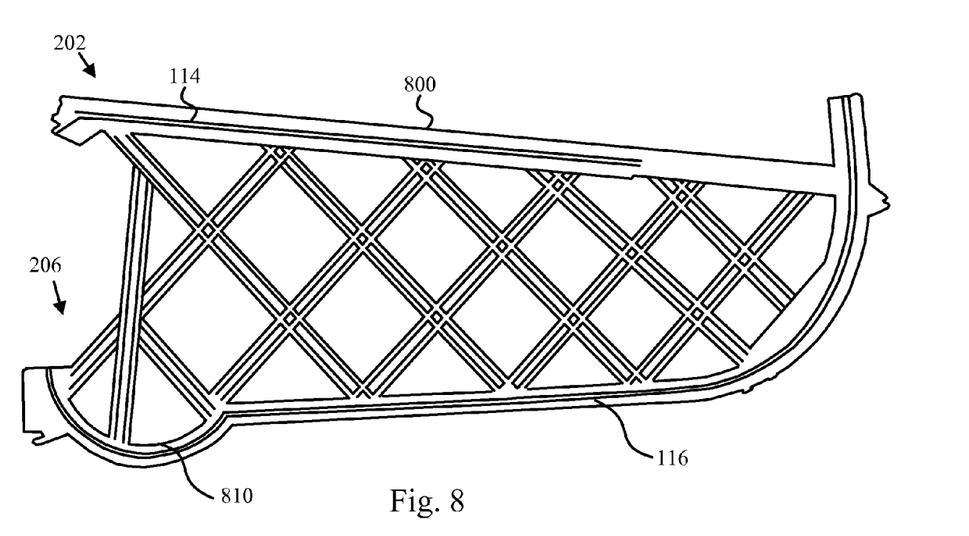
FIGS. 8 and 9 are perspective side view drawings depicting one embodiment of a container guide with a concave depression proximate to the dispensing area.
Figure 9:
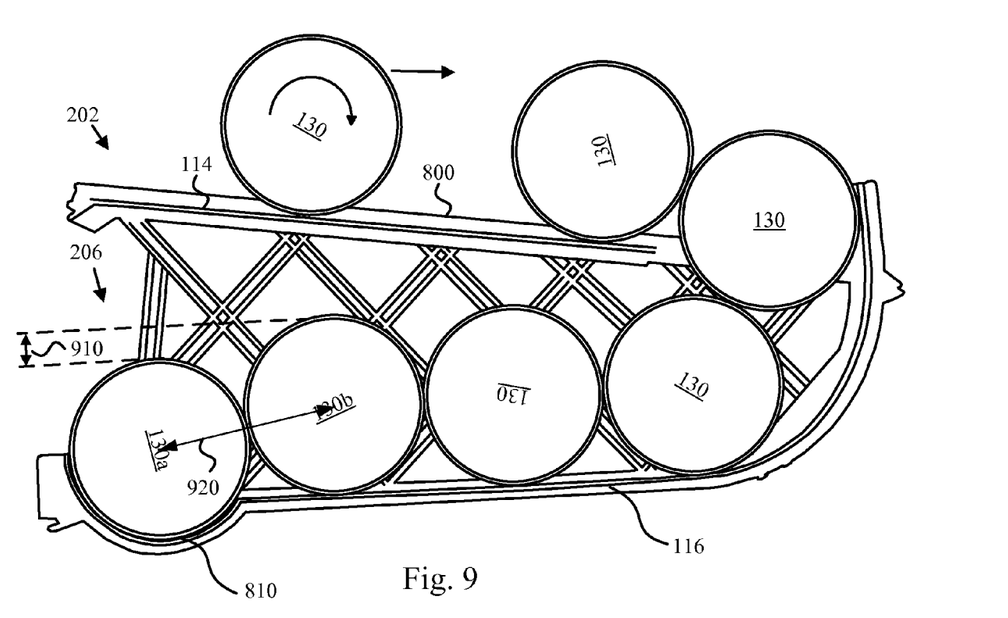

Referring now to FIGS. 8 and 9, a concave depression 810 may be placed proximate to the dispensing area 206, and enable the container guide 800 to cradle a first container 130a at a lower relative position 910 along a lower track trajectory than a second container 130b of the same diameter and thereby direct a substantial portion of a collision force between the second container 130b and the first container 130a into the lower track rail 116. As shown in FIG. 9, the depression 810 may conform to at least 90 degrees of the perimeter of cylindrical containers intended to be stored by the container guides 800. The lower relative position 910 may result in a slope 920 between the first container and the second container that is at least 10 degrees greater than a slope of the lower track rail 116 previous to the concave depression 810. For example, in the depicted embodiment, the slope of the lower track rail 116 is less than 2.5 degrees and the slope 920 is greater than 13 degrees. As cylindrical containers 130 are inserted to the receiving area upper track rail 114, they roll down the upper track rail 144 and are transferred to the lower track rail 116. If the first container 130a is already cradled in the concave depression 810, the force of the resulting collision between the first container 130a and the second container 130b may be directed in the direction of the slope 920 and into a portion of the concave depression 810 which may receive a substantial portion of the collision force and prevent the first container 130a from being ejected from the dispensing area 206.

By retaining a first container 130a within the concave depression 810 at a lower relative position 910 along the lower track trajectory a substantial portion of a collision force between the second container 130b and the first container 130a is directed into the lower track rail 116. The lower relative position 910 of the first container 130a relative to the trajectory of the lower track rail 116 essentially enables the first container 130a to function as a stop for the second container 130b. Subsequent cylindrical containers 130 placed on the container guide 800 also result in a collision force between the second container 130b and the first container 130a which collision force is primarily directed into the lower track rail 116 in order to prevent ejection of the first container 130a from the container guide at the dispensing area 206.

The present invention provides improved means and methods for storing cylindrical containers. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for storing cylindrical containers, the system comprising:
   a plurality of container guides configured to store cylindrical containers therebetween when positioned substantially parallel to each other, each container guide comprising an upper track rail configured to guide a container placed on either side thereof from a receiving area toward a transfer area, and a lower track rail configured to guide a container placed on either side thereof from the transfer area toward a dispensing area, and an interlocking element disposed on the bottom of the lower track rail;
   at least one spacing member comprising a discrete plurality of interlocking positions, each interlocking position configured to interlock with the interlocking element of a container guide, wherein each interlocking position comprises a void shaped to interlock with the interlocking element; and
   wherein the interlocking element comprises a shank configured to fit within the void and a cap configured to cover the void and retain the spacing member between the cap and the lower track rail.

2. The system of claim 1, further comprising a frame configured to receive the plurality of container guides.

3. The system of claim 2, wherein the frame comprises a front and a back support member that are substantially horizontal and parallel to each other and wherein the plurality of container guides are supported from the front and back support members.

4. The system of claim 1, wherein the upper track rail and lower track rail comprise left and right bearing surfaces and a track separator.

5. The system of claim 1, wherein the plurality of container guides are further configured to rest on a level shelf.

6. The system of claim 1, wherein the lower track rail further comprises a stop configured to prevent a container from overrunning the dispensing area.

7. The system of claim 1, wherein the upper track rail is vertically extended at the transfer area.

8. The system of claim 1, wherein the upper track rail and the lower track rail comprise left and right bearing surfaces.

9. The system of claim 1, wherein the upper track rail and the lower track further comprise a track separator.

10. The system of claim 1, wherein the upper track rail comprises a ribbed track separator.

11. An apparatus for storing cylindrical containers, the apparatus comprising:
    an upper track rail configured to guide a container placed on either side thereof from a receiving area toward a transfer area;
    a lower track rail configured to guide a container placed on either side thereof from the transfer area toward a dispensing area;
    an interlocking element disposed on the bottom of the lower track rail;
    the upper track rail and the lower track rail integrally formed into a container guide configured to store cylindrical containers when positioned substantially parallel to another container guide;
    at least one spacing member comprising a discrete plurality of interlocking positions, each interlocking position configured to interlock with the interlocking element of a container guide, wherein each interlocking position comprises a void shaped to interlock with the interlocking element; and
    wherein the interlocking element comprises a shank configured to fit within the void and a cap configured to cover the void and retain the spacing member between the cap and the lower track rail.

12. The apparatus of claim 11, further comprising a frame mating element configured to mate with a frame.

13. The apparatus of claim 11, further comprising at least one foot.

14. The apparatus of claim 11, wherein the lower track rail further comprises a stop configured to prevent a container from overrunning the dispensing area.

15. The apparatus of claim 11, wherein the upper track rail is vertically extended at the transfer area.

16. The apparatus of claim 11, wherein the upper track rail and the lower track rail comprise left and right bearing surfaces.

17. The apparatus of claim 11, wherein the upper track rail and the lower track further comprise a track separator.

18. The apparatus of claim 11, wherein the upper track rail comprises a ribbed track separator.

19. A method for storing cylindrical containers, the method comprising:
    providing a plurality of container guides configured to store cylindrical containers therebetween when positioned substantially parallel to each other, each container guide comprising an upper track rail configured to guide a container placed on either side thereof from a receiving area toward a transfer area, and a lower track rail configured to guide a container placed on either side thereof from the transfer area toward a dispensing area, and an interlocking element disposed on the bottom of the lower track rail;
    providing at least one spacing member comprising a discrete plurality of interlocking positions, each interlocking position configured to interlock with the interlocking element of a container guide, wherein each interlocking position comprises a void shaped to interlock with the interlocking element, wherein the interlocking element comprises a shank configured to fit within the void and a cap configured to cover the void and retain the spacing member between the cap and the lower track rail; and
    interlocking the spacing member with the lower track rail via the interlocking element.

* * * * *